2 Sheets—Sheet 1.
J. B. SUFFERN.
RAILWAY SWITCH.
No. 11,248. Reissued June 21, 1892.
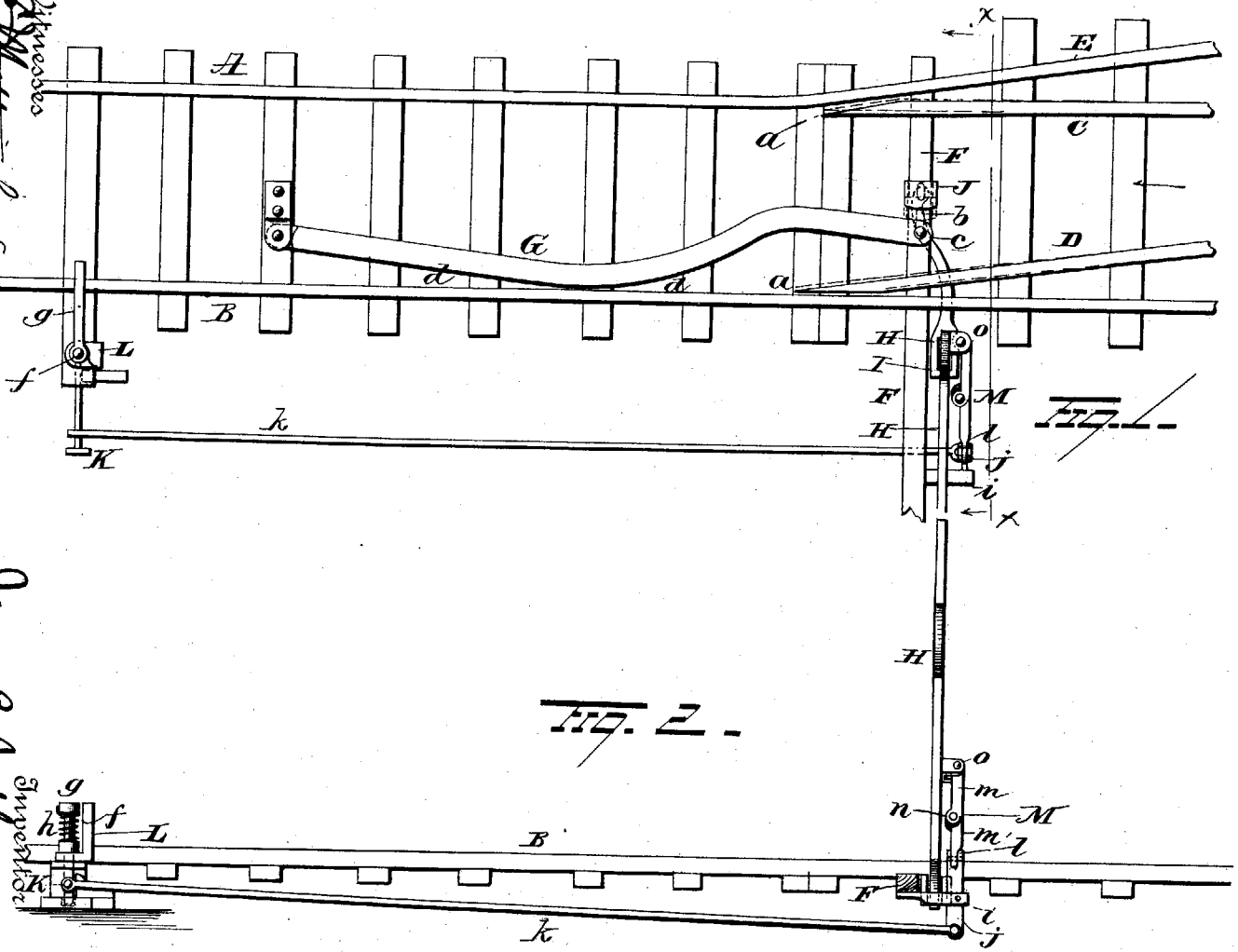
Witnesses
E. Mottinghand
Geo F. Downing
Inventor
James B. Suffern.
By his Attorney
H. A. Dupuy
THE NORRIS PETERS CO., PHOTO-LITHO., WASHINGTON, D. C.

2 Sheets—Sheet 2.
J. B. SUFFERN.
RAILWAY SWITCH.
No. 11,248. Reissued June 21, 1892.
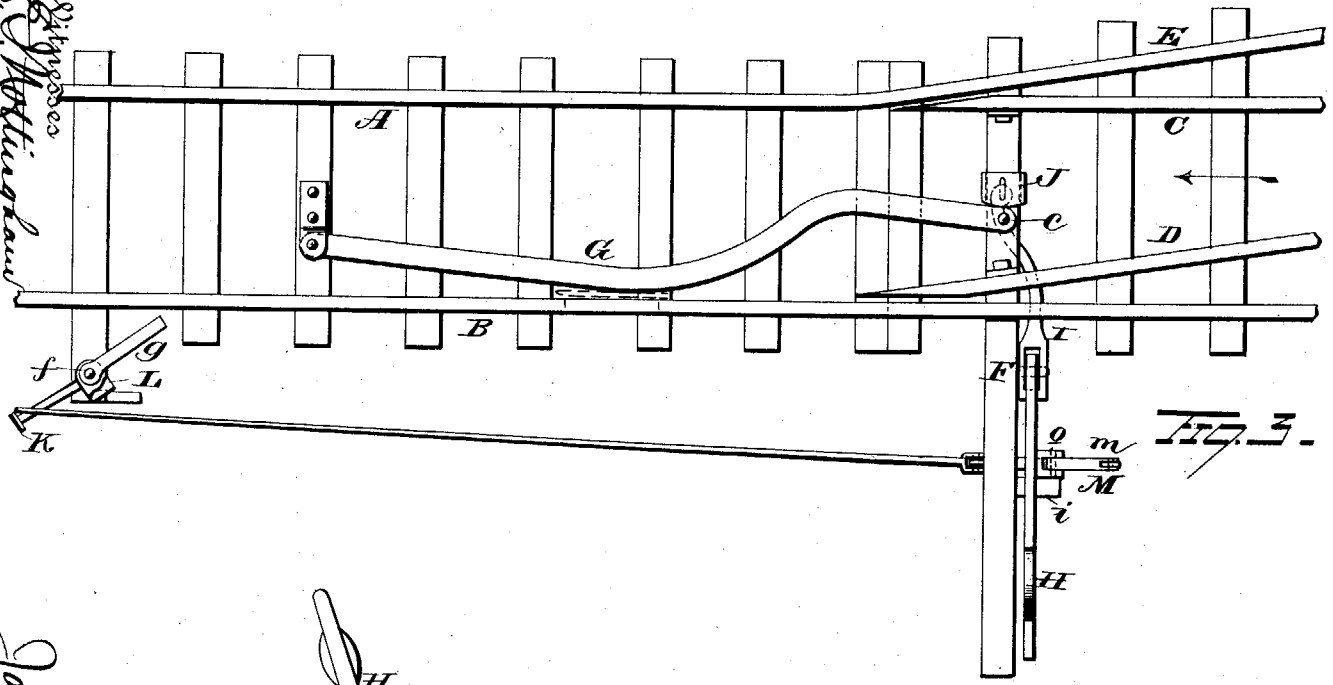
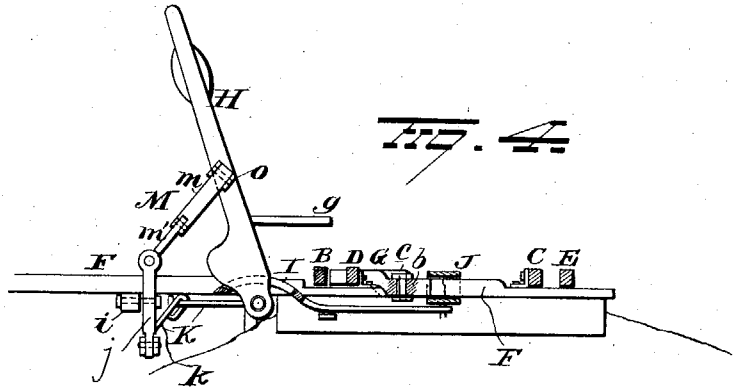
Witnesses
C. S. Mottinghaw
Geo T. Downing
Inventor
James B. Suffern.
By his Attorney
H. A. Seymour
THE NORRIS PETERS CO., PHOTO-LITHO., WASHINGTON, D. C.

UNITED STATES PATENT OFFICE.

JAMES B. SUFFERN, OF HILLBURN, NEW YORK.

RAILWAY-SWITCH.

SPECIFICATION forming part of Reissued Letters Patent No. 11,248, dated June 21, 1892.

Original No. 370,988, dated October 4, 1887. Application for reissue filed September 21, 1889. Serial No. 324,684.

*To all whom it may concern:*

Be it known that I, JAMES B. SUFFERN, a resident of Hillburn, in the county of Rockland and State of New York, have invented certain new and useful Improvements in Railway-Switches; and I do hereby declare the following to be a full, clear, and exact description of the invention, such as will enable others skilled in the art to which it appertains to make and use the same.

Figure 1 is a plan view of a switch embodying my improvement. Fig. 2 is a side elevation of the same. Fig. 3 is a plan view of my improvement, showing the parts in position to cause the engine to keep on the main track; and Fig. 4 is a cross-section of the same on the line *x x* in Fig. 1.

Similar letters of reference indicate corresponding parts in all the views.

The object of my invention is to provide a switch which will be operated by the locomotive without the necessity of applying to the locomotive any fixtures and without any attention from the locomotive-engineer.

My invention consists in the combination, with a track-lever adapted to operate the switch-bar, of a locking and releasing device connected with the switch-bar and adapted to lock the track-lever, so as to cause it to move the switch-bar when engaged by the car-wheels, and thus close the switch, or to release the track-lever, so that a passing train will produce no effect upon the switch-bar, thereby permitting the train to take a side track.

The main-track rails A B are arranged with reference to the switch-rails C D in the usual way—that is to say, the switch-rail D is provided with a tapered end *a*, adjoining the track-rail B, and the switch-rail C forms a portion of the main track, while the main-track rail A is connected permanently with the siding rail E. The switch-rail D and the siding rail E therefore form the siding, while the main-track rail A, the switch-rail C, and the main-track rail B form the main track. The rails C D are fixed at one end and arranged to spring at their free tapered ends, the free ends being attached to a switch-bar F, which is connected with a switch-stand of any approved construction. The switch-bar F is provided with a slot *b* near the center thereof, and to one of the ties a short distance from the points of the switch-rails is pivoted a curved track-lever G, having a forked end, which embraces the switch-bar F, and is provided with a bolt *c*, which passes through the slot *b* of the switch-bar. The convex side of the curved track-lever G is normally in contact with the track-rail B, leaving wedge-shaped openings *d* upon each side of the point of contact between the convex side of the track-lever and the rail B, so that a car-wheel passing along the rail B in either direction would throw the track-lever G away from the rail B.

Upon the side of the switch-bar F is pivoted a weighted cam-lever H, embraced by a yoke I, connected with a slide J, placed on the switch-bar F, beyond the forked end of the track-lever G. By means of the cam-lever H the slide J may be locked in a position remote from the slot *b* of the switch-bar F, so as to permit of the free movement of the track-lever G without moving the switch-bar, or it may be locked against the side of the track-lever, so as to prevent the track-lever from moving without moving the slide J and the bar F. When the lever H is raised, the track-lever is free; but when the said lever is depressed the track-lever is locked to the switch-bar F, so that the said lever cannot move without also moving the switch-bar.

To render this device automatic, a vertical shaft *f* is placed at a short distance from the track-lever and provided with an arm K, also with a right-angled arm L, which extends outward and upward. Upon the upper end of the shaft *f* is loosely placed an arm *g*, which projects into the path of the locomotive-pilot and is held in position by a spiral spring *h*, surrounding the shaft *f*, and attached at one end to the said shaft and at the other end to the arm *g*. Upon an arm *i*, projecting from the side of the switch-bar F, is pivoted a lever *j*, which is connected by a rod *k* with the arm K. In the upper end of the lever *j* is formed a slot *l*, at right angles to the plane of the movement of said lever, and in the slot *l* is pivoted one end of a toggle M, formed of two arms *m m'*, jointed together by the pivotal pin *n*. The opposite end of the toggle M is pivoted between a pair of ears *o*, projecting from the side of the lever H.

When a train approaches the switch in the direction indicated by the arrow, it may safely pass over the switch in the usual way without affecting any of the working parts other than to set the switch in a closed position, so as to render the main track practically continuous. When a train approaches the switch from the opposite direction, the pilot of the locomotive engages the lever *g*, bringing it into engagement with the arm L, thereby turning the shaft *f*, tripping the toggle M, allowing the lever H to fall by its own gravity into a position parallel with the bar F, and the track-lever G being locked with the bar F, the engagement of the wheels with the track-lever pushes it away from the track-rail B, and thus moves the bar F and switch-rail C, as indicated in dotted lines in Fig. 1, thereby rendering the track continuous, so that the train may pass over the switch in safety without danger of being run onto the siding.

From the foregoing it will be seen that the automatic part of the invention is for the purpose of setting the switch so that trains cannot enter the siding; but should occasion arise when it is desirable to run the train onto the siding when approaching from the left, this is done by stopping or slowing the train after the locomotive has passed the lever *g*. It must be borne in mind that this lever may be located a considerable distance from the switch, if necessary. The switchman then sets the switch and raises the lever H. This forces the slide J from contact with lever G. The latter is thus free to move without affecting the switch, and although it is moved by the passing car-wheels the switch remains as set in the position shown in full lines in Fig. 1 and the train passes onto the siding. In other words, to enter the siding (from the left) the switch must be set by hand after the locomotive has first passed lever *g*, and the lever H must be raised by hand. This is all that is necessary.

It will be seen that as the arm *g* is free to move in the opposite direction the passing of the train in from the switch toward the shaft *f* will produce no effect other than moving the lever *g* against the pressure of the spring *h*.

When it is desired to operate the switch by hand in the usual way, the lever H is raised and locked in the raised position by the toggle M, and if the attendant should leave the lever H in an elevated position the arm *g*, shaft *f*, and arm K will be brought into action, as the arm *g* will be engaged by the locomotive, so as to turn the shaft *f* and draw upon the rod *k*, thereby turning the lever *j* and unlocking the toggle M, permitting the lever H to fall, and, by moving the slide J forward, lock the track-lever G fast to the bar F, thereby putting the track-lever in position to be engaged by the car-wheels, as before.

Having fully described my invention, what I claim as new, and desire to secure by Letters Patent, is—

1. In a railway-switch, the combination, with main track and movable switch-rails, of a switch-operating bar, a pivoted track-lever having sliding connection with the bar, and a lock for locking the lever and bar together, substantially as set forth.

2. The combination, with the main-track rails and movable switch-rails, of a switch-rail-operating bar, a track-lever having loose connection with said operating-bar, and means for locking the two together automatically by the action of the train, whereby one operates the other, substantially as set forth.

3. The combination, with a switch rail-operating bar, of a track-lever having loose connection therewith, a slide for locking the lever and bar together, and means for automatically moving and locking said slide, substantially as set forth.

4. The combination, with the slotted switch-rail-operating bar F, of the curved pivoted track-lever G, having a forked end embracing the bar F, the pin *c*, passing through the fork of the said track-lever and through the slot of the bar F, the slide J, and means for moving and locking the said slide, substantially as specified.

5. The combination, with the curved track-lever G and the slotted switch-operating bar F, of the slide J, yoke I, connected with the slide J, and the cam-lever H, substantially as specified.

6. The combination of the track-lever G, bar F, slide J, yoke I, the toggle M, lever *j*, rod *k*, shaft *f*, provided with the fixed arms K L, the movable arm *g*, and spring *h*, connecting the said arm *g* with the shaft *f*, substantially as specified.

JAMES B. SUFFERN.

Witnesses:
WILLIAM H. OSBORN,
WILLIAM KELLEY.